United States Patent
Pennino (10) Patent No.: US 8,191,844 B2
(45) Date of Patent: Jun. 5, 2012

(54) CONTAINER HOLDER FOR USE ON A BICYCLE

(76) Inventor: William Pennino, Oyster Bay, NY (US)

( * ) Notice: Subject to any disclaimer, the term of this patent is extended or adjusted under 35 U.S.C. 154(b) by 312 days.

(21) Appl. No.: 12/319,680

(22) Filed: Jan. 9, 2009

(65) Prior Publication Data

US 2010/0176259 A1    Jul. 15, 2010

(51) Int. Cl.
*A47B 96/00* (2006.01)
(52) U.S. Cl. ........... 248/222.52; 248/309.1; 248/220.21; 220/737; 224/414; 403/348; 215/386
(58) Field of Classification Search .............. 248/309.1, 248/310, 311.2, 314, 682, 222.52, 220.22, 248/220.21, 225.11, 223.41; 220/737, 739, 220/630, 629, 628; 224/414, 926; 403/348, 403/349, 350; 215/386, 396, 397, 398
See application file for complete search history.

(56) References Cited

U.S. PATENT DOCUMENTS

| | | | | |
|---|---|---|---|---|
| 650,272 A * | 5/1900 | Perry | | 248/264 |
| 2,833,247 A * | 5/1958 | Beyea | | 119/51.03 |
| 3,266,200 A * | 8/1966 | Block | | 451/509 |
| 3,949,524 A * | 4/1976 | Mickelson | | 47/79 |
| 4,009,810 A | 3/1977 | Shook | | |
| 4,040,549 A * | 8/1977 | Sadler | | 224/483 |
| 4,071,175 A | 1/1978 | Wagnon | | |
| 4,127,211 A * | 11/1978 | Zerbey | | 220/212 |
| 4,315,382 A * | 2/1982 | Kay et al. | | 47/71 |
| 4,366,922 A | 1/1983 | Levine et al. | | |
| 4,507,006 A * | 3/1985 | Golob et al. | | 403/24 |
| 4,527,760 A * | 7/1985 | Salacuse | | 248/108 |
| 4,570,835 A | 2/1986 | Criqui et al. | | |
| 4,596,370 A | 6/1986 | Adkins | | |
| 4,830,240 A | 5/1989 | Tackles et al. | | |
| 4,919,381 A * | 4/1990 | Buist | | 248/154 |
| 4,948,080 A | 8/1990 | Jack | | |
| 4,981,022 A | 1/1991 | Snyder | | |
| 5,040,709 A | 8/1991 | Neugent | | |
| 5,145,138 A | 9/1992 | Schlanger et al. | | |
| 5,174,534 A * | 12/1992 | Mitchell | | 248/311.2 |
| D337,288 S | 7/1993 | Ringle' | | |
| 5,294,018 A * | 3/1994 | Boucher | | 220/603 |
| 5,326,006 A | 7/1994 | Giard et al. | | |
| 5,413,231 A * | 5/1995 | Carroll et al. | | 215/396 |
| 5,624,064 A * | 4/1997 | McGee, Jr. | | 224/414 |
| 5,649,386 A * | 7/1997 | Rynberk | | 47/41.14 |
| 5,722,574 A * | 3/1998 | Pratt | | 224/148.4 |
| 5,765,715 A * | 6/1998 | Hughes | | 220/737 |
| 5,810,228 A | 9/1998 | Brokering | | |
| 5,839,632 A | 11/1998 | Koday | | |
| 6,003,205 A * | 12/1999 | Dehaven | | 16/425 |

(Continued)

OTHER PUBLICATIONS

CSC—Champion's Saddlebags Collection, 2009 Sci'con Collection Catalogue, pp. 18-21.

*Primary Examiner* — Kimberly Wood
(74) *Attorney, Agent, or Firm* — Hoffmann & Baron, LLP (57) ABSTRACT

Embodiments of the present invention include a container holder for a bicycle that has a mounting member and a mating member. The mounting member facilitates mounting the container holder to a portion of the bicycle. The mating member is operatively coupled to the mounting member and is interdependently configured to inter-engage a corresponding reciprocal mating member of a container upon receipt of the container by the container holder to facilitate retention of the container by the container holder.

11 Claims, 9 Drawing Sheets

U.S. PATENT DOCUMENTS

| | | |
|---|---|---|
| 6,059,245 A | 5/2000 | Hermansen et al. |
| 6,302,617 B1 * | 10/2001 | Rumpp ..................... 403/348 |
| 6,637,244 B2 | 10/2003 | Haraughty |
| 6,834,838 B2 * | 12/2004 | Dennis et al. ............. 248/311.2 |
| 6,837,407 B1 | 1/2005 | Towers et al. |
| 6,910,604 B2 * | 6/2005 | Gugliotti et al. ........... 222/179.5 |
| 7,007,819 B2 * | 3/2006 | Pollack ..................... 220/662 |
| 7,770,748 B2 * | 8/2010 | Elliott ....................... 220/212 |
| 2004/0200941 A1 * | 10/2004 | Dennis et al. ............. 248/311.2 |

* cited by examiner

CONTAINER HOLDER FOR USE ON A BICYCLE

BACKGROUND

1. Field of the Invention

The present invention is directed to container holders, and more specifically, to container holders to be mounted on a bicycle frame.

2. Brief Discussion of Related Art

Water bottle cages are typically formed as wire cages that attach to a frame of a bicycle. A water bottle typically fits within a cavity defined by the cage, which retains the water bottle using a compression fit. That is, when the water bottle is positioned within the cage, the cage generally exerts inward pressure on the longitudinal surface of the water bottle to constrict the water bottle within the cavity. The compression fit of conventional water bottle cages is generally insufficient for securely retaining the water bottle within the cavity of the cage. For example, when cyclists ride over bumps or on irregular terrain the water bottles can be jarred loose from the water bottle cage.

SUMMARY OF THE INVENTION

According to aspects illustrated herein, a container holder for a bicycle is disclosed that includes a mounting member and a mating member. The mounting member facilitates mounting the container holder to a portion of the bicycle. The mating member is operatively coupled to the mounting member and is interdependently configured to inter-engage a corresponding reciprocal mating member of a container upon receipt of the container by the container holder to facilitate retention of the container by the container holder.

According to yet other aspects illustrated herein, a container holder system for a bicycle is disclosed that includes a container and a holder. The container has a first mating member. The holder is on the bicycle and has a second mating member. The first and second mating members are interdependent so that the first and second mating members inter-engage upon receipt of the container by the holder to facilitate retention of the container by the container holder.

In some embodiments the shield at least partially surrounds, and spaced away from, the mating member, where the shield is configured to receive at least a portion of the container. The shield can be dimensioned so that the interior area of the shield is configured to receive a bottom portion of a container so that the bottom portion of the container nests within the shield.

The container holder can include a guide structure configured to align the container with the container holder to facilitate penetration of the prong into the recess. The guide structure can be a guide member that has a substantially conical configuration extending away from the base portion. The guide member can extend along a center axis of the holder and can extend a greater distance from the base than that of the prong.

The mating member of the container holder can include a prong. The prong can include a lip to interlock the container with the container holder. The lip can extend from a distal end of the prong in a substantially orthogonal manner and can interlock the container with the container holder in response to a rotation of the container about a center axis of the container when the prong is positioned within the recess. The prong extends into the interior area formed by the shield.

According to yet other aspects illustrated herein, a method of selectively retaining a container in a container holder that is mountable to a bicycle is disclosed. The method includes mounting the container holder to the bicycle, inserting the container into the container holder, and aligning a first mating member associated with the container with a second mating member associated with the container holder to selectively interlock the container to the container holder.

The method can also include inserting a bottom of the container into an interior area formed by a shield of the container holder; and aligning a recess formed on a bottom of the container with the a guide member of the container holder and inserting the container into the container holder so that the guide member penetrates and extends into the recess to guide the container into the container holder. Aligning the first mating member with the second mating member can include rotating the container to a locked position so that the first and second mating member inter-engage, thereby preventing removal of the container from the container holder. The container can be removed from the container holder by rotating the container the container to an unlocked position.

Other objects and features of the present invention will become apparent from the following detailed description considered in conjunction with the accompanying drawings, wherein like reference numerals in the various drawings are utilized to designate like components. It is to be understood, however, that the drawings are designed as an illustration only and not as a definition of the limits of the invention.

DETAILED DESCRIPTION OF THE PREFERRED EMBODIMENTS

Embodiments of the present invention are directed to a container holder and a corresponding container. The container holder and the container have interdependent reciprocal mating members for retention of the container by the container holder. The container holder can have a base portion and/or a shield from which projections extend. In some embodiments, the projections can include prongs and a guiding member that interface with the corresponding container, which can have depressions recessed inwardly into a cavity of the container to provide a negative space for receiving the projections. In some embodiments, the prongs can include a retaining member to selectively secure the container to the holder and to prevent the container from being removed from the holder. The container holder is preferably configured to be mounted on a bicycle frame.

Figure 1:
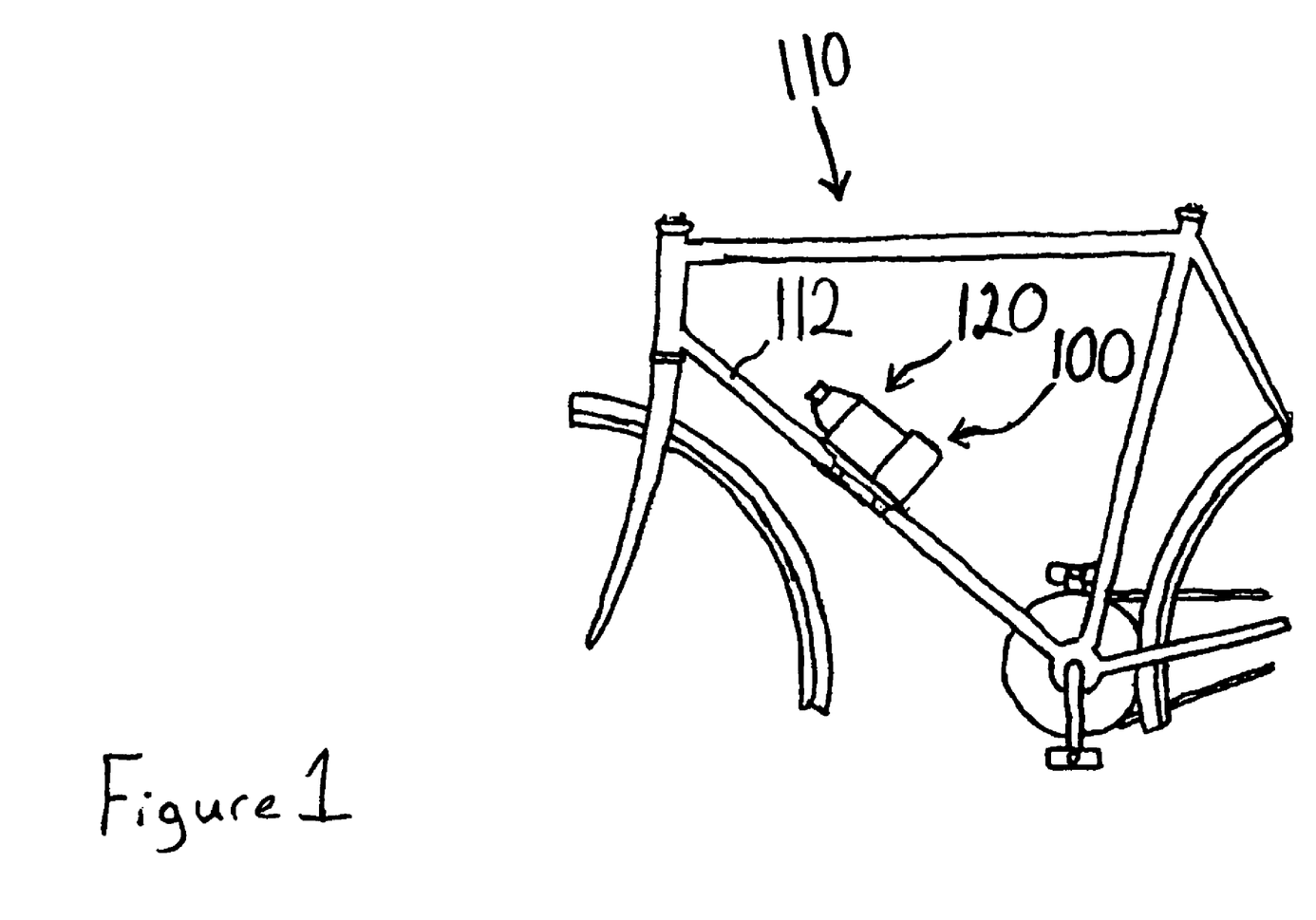
FIG. 1 illustrates a container holder mounted on an exemplary bicycle and retaining a container in accordance with embodiments of the present invention.

FIG. 1 depicts a container holder 100 (hereinafter "holder 100") on an exemplary bicycle 110. The holder 100 retains a container 120, such as a water bottle or other rigidly or semi-rigidly formed container. For example, the container 120 can be formed from extruded plastic, molded plastic, metal, a carbon composite, and/or the like, and can be configured as a cylinder, polyhedron, or other shape. In some embodiments, the holder can be integrally formed on a frame 112 of the bicycle 110. In other embodiments, the holder 100 is mounted on the frame 112 of the bicycle 110 using a conventional mounting mechanism, such as nuts and bolts, clamps, and the like. The holder 100 can be formed from individual components or manufactured in an integrated form and is composed of one or more of metal, plastic, carbon composites, and/or the like. The holder 100 can be configured to selectively interlock with the container 120 to securely retain the container 120.

Figure 2:
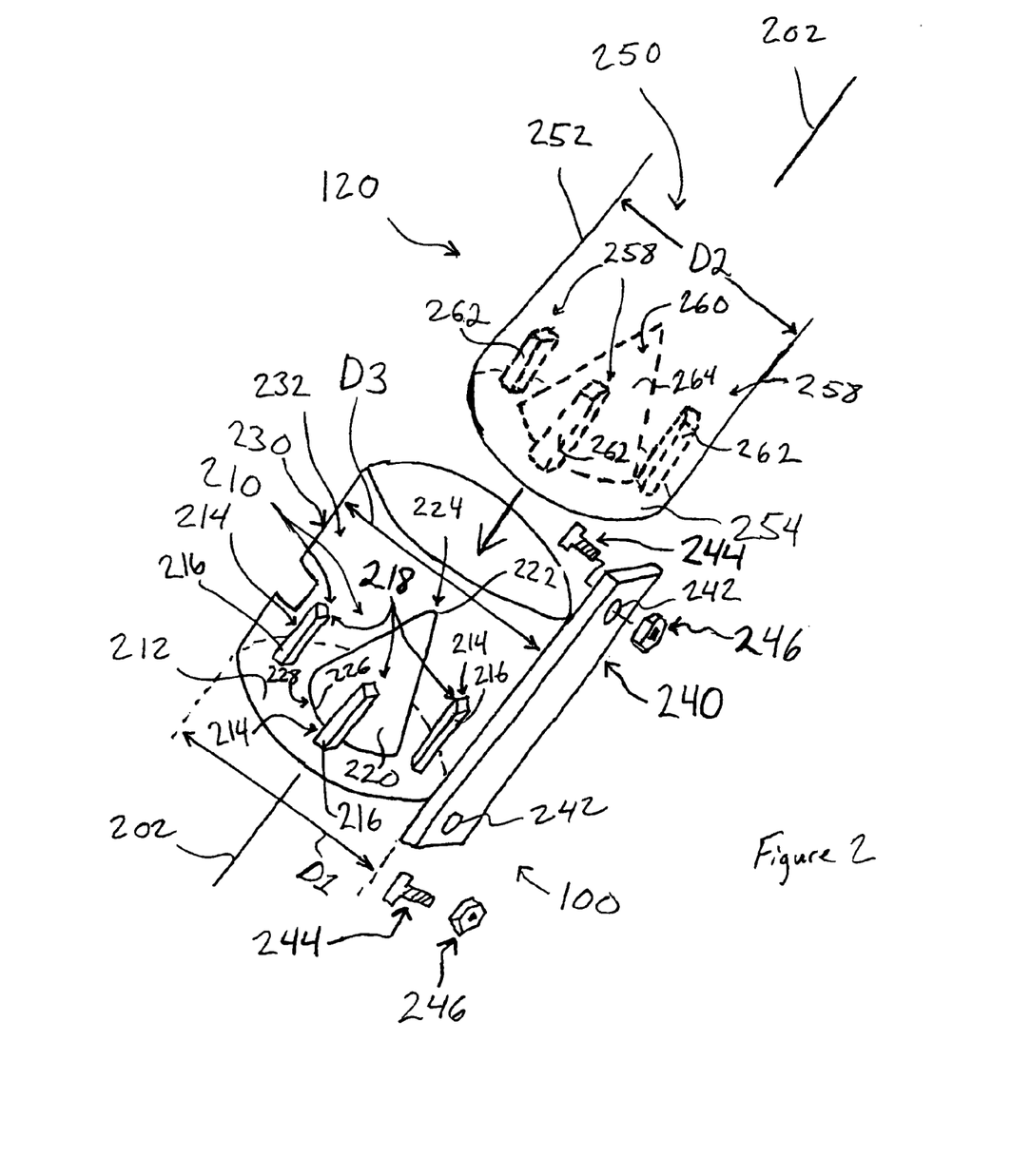
FIG. 2 is a perspective view of one embodiment of the container holder and corresponding container of FIG. 1.

FIG. 2 is a perspective view of one embodiment of the holder 100 and corresponding container 120. The holder 100 includes projections 210, shield 230, and a mount 240. The container 120 includes a cavity 250 formed from a longitudinal body 252, a bottom 254 with recesses 258 and 260, and a top (FIG. 1). The projections 210 and the recesses 258 and 260 form interdependent reciprocal mating members that can inter-engage to assist in the retention of the container 120 by the holder 100.

The projections 210 extend longitudinally from a base portion 212 of the holder 100. In the present embodiment, the base portion 212 includes a surface for supporting the bottom 254 of the container 120. The surface of the base portion 212 is configured to generally correspond to the shape of the bottom 254 of the container 120. For example, for embodiments where the container 120 is cylindrical, the surface of the base portion 212 can be generally circular with a diameter D1 that is larger than a diameter D2 of the bottom 254 of the container 120 to ensure that the container 120 fits in the holder 100.

The projections 210 include prongs 214 and a guide member 220. Recesses 258 have a negative space 262 corresponding to the prongs 214. The prongs 214 have elongate sections 216 that extend away from the base portion 212 in a generally orthogonally manner. The elongate sections 216 of the prongs 214 can have a rod-like configuration, a polyhedron-like configuration, or other suitable configuration. A distal end 218 of the elongate section 216 can be tapered, rounded, or otherwise shaped to facilitate a smooth receipt of the container 120 without excessively damaging the container 120.

The prongs 214 are distributed about the base portion 212. For example, the prongs 214 can be distributed radially about a center axis 202. The prongs 214 are positioned to fit within an outline 256 of the bottom 254 of the container 120 so that when the container 120 is inserted into the holder 100, the prongs 214 extend into the bottom 254 of the container 120 through corresponding recesses 258, which are formed in the bottom 254 of the container 120. The recesses 258 extend into the cavity 250 of the container 120. In some embodiments, the elongate sections 216 of the prongs 214 extend a distance of about one-eighth of an inch to about three inches, or about one-fourth of an inch to about three-fourths of an inch from the base portion 212, or can extend about one-third of the length of the longitudinal body of the container 120.

The guide member 220 facilitates aligning the container 120 with the holder 100 to ensure that the container 120 is directed into the holder 100. Recess 260 has a negative space 264 corresponding to the guide member 220. In the present embodiment, the guide member 220 has a generally conical configuration, although, those skilled in the art will recognize that the guide member can have other configurations, such as a pyramidal configuration, semispherical configuration, domical configuration, polyhedron configuration, or other suitable configuration for guiding the container 120 into the holder 100. An apex 222 is formed at a distal end 224 of the guide member 220 and a base 226 is formed at a proximate end 228 of the guide member 220. The apex 222 of the guide member 220 is positioned along the center axis 202. The guide member 220 extends away from the base portion 212 a distance greater than the distance the prongs 214 extend from the base portion 212 so that the bottom 254 of the container 120 reaches the apex 222 of the guide member 220 prior to reaching the prongs 214.

As the container 120 is inserted into the holder 100, the guide member 220 aligns the container 120 so that the center of the bottom 254 of the container 120 aligns with the center axis 202 of the base portion 212 and so that the prongs 214 can be aligned with the recesses 258 formed in the bottom of the container 120. In some embodiments, the guide member 220 can be configured (e.g., asymmetrically or otherwise) to facilitate rotation of the container 120 about the center axis 202 as the container 120 is being inserted into the holder 100 so that the prongs 214 are automatically aligned with the recesses 258 in the bottom 254 of the container 120.

The shield 230 is formed to correspond to the shape of the container 120 to provide support to the container 120 when the container 120 is being retained by the holder 100 and/or can facilitate guiding the container 120 into the holder 100. For example, for embodiments where the container 120 is cylindrical, the shield 230 is a cylindrical tube having an interior area 232 with an open circumferential face 234 for receiving the container 120. The diameter D2 of the container 120 is smaller than a diameter D3 of the shield 230 so that at least a portion of the container 120 can be nested with the shield 230.

A longitudinal body 236 of the shield 230 extends at least about one-third of the length of the container 120. In some embodiments, the longitudinal body 236 of the shield 230 extends about one-fourth to about one-half of the length of the container 120. The longitudinal body 236 of the shield 230 extends from the base portion 212 and can substantially surround the projections 210 so that the projections 210 extend into the interior area 232 formed by the shield 230. In some embodiments, there can be a space between the shield 230 and the base portion 212, and in other embodiments, the shield 230 and the base portion 212 can be integrated as joined components or as a continuously formed component. The shield 230 can include openings in the longitudinal body 236 to decrease the overall weight of the holder 100 and in some embodiments can be formed from a rigid or semi-rigid lattice structure.

The mount 240 can be fixedly attached or removeably attached to the shield 230 and/or base portion 212 to facilitate attachment of the holder 100 to a portion of the bicycle frame 112. In one embodiment, the mount 240 includes openings 242 that are spaced to align with openings on the frame of the bicycle so that bolts 244 can be passed through the openings 242 and the openings on the frame 112 of the bicycle 110 and secured with nuts 246 to attach the holder 100 to the bicycle frame 112. In other embodiments, the mount 240 can include clamps, straps, or other fastening mechanisms for attaching the holder 100 to the bicycle frame 112.

In the present embodiment, the container 120 is a water bottle composed of plastic for retaining a liquid, although, other material, such as metal, can be used to form the container 120. The container 120 preferably has a cylindrical configuration, which can be ergonomically formed for a user to grip with one or both hands. In some embodiments, the recesses 258 are molded, extruded, or otherwise formed in the bottom so that the recesses 258 extend into the cavity 250. In some embodiments, the recesses 258 can extend into the cavity 250 about one-eighth of an inch to about three inches, or about one-fourth of an inch to about three-fourths of an inch from the bottom 254, or can extend about one-third of the length of the longitudinal body of the container 120. For example, recesses 258 can be molded around replicates of the projections 210 to ensure that the recesses 258 are appropriately sized to receive the projections 210.

The thickness of the container 120 can be uniform such that the recesses 258 and 260, bottom 254, and longitudinal body 252 can have a substantially identical thickness. In other embodiments, the thickness of the bottom 254 and recesses 258 can be greater than the thickness of the longitudinal body 252 to provide a higher level of resiliency to the bottom 254 and the recesses 258 so that the container 120 is not readily damaged from repeated insertion and removal from the holder 100. The negative spaces 262 and 264 formed by the recesses 258 and 260, respectively, are slightly larger than the projections 210 so that the recesses 258 and 260 can receive the projections 210.

As the container 120 is being inserted into the holder 100, the bottom 254 of the container 120 is guided into the holder 100 by the guide member 220 and/or the shield 230. The container 120 is guided by the guide member 220 and/or the shield 230 so that the recess 260 engages and receives the guide member 220. As the guide member 220 penetrates the recess 260, the bottom 254 of the container 120 is positioned so that the recesses 258 are aligned with the prongs 214.

In some embodiments, the guide member 220 automatically rotates the container 120 about the center axis 202 of the container 120 to automatically align the recesses 260 and the prongs 214. In other embodiments, the user can rotate the container 120 until the recesses 258 are aligned with the prongs 214. In yet other embodiments, the shape of the bottom 254 of the container 120 and the shield 230 restrict orientation for which the bottom 254 can be inserted into the holder 100 so that the prongs 214 and the recesses 258 corresponding to the prongs 214 are automatically aligned.

Once the recesses 258 and the prongs 214 are aligned, the container 120 is further inserted into the holder 100 causing the prongs 214 to penetrate and engage the recesses 258. The container 120 is fully inserted into the holder 100 when the bottom 254 of the container 120 rests on the surface of the base portion 212 and/or when the prongs 214 have been fully received by the recesses 258. In this position, the holder 100 securely retains the container 120 so that movement of the container 120 is restricted to prevent or reduce the likelihood that the container 120 is jarred loose during use of the bicycle 110. The container 120 can be removed by the user by pulling the container 120 from the holder 100 so that the projections 210 slide out from the recesses 258.

Figure 3:
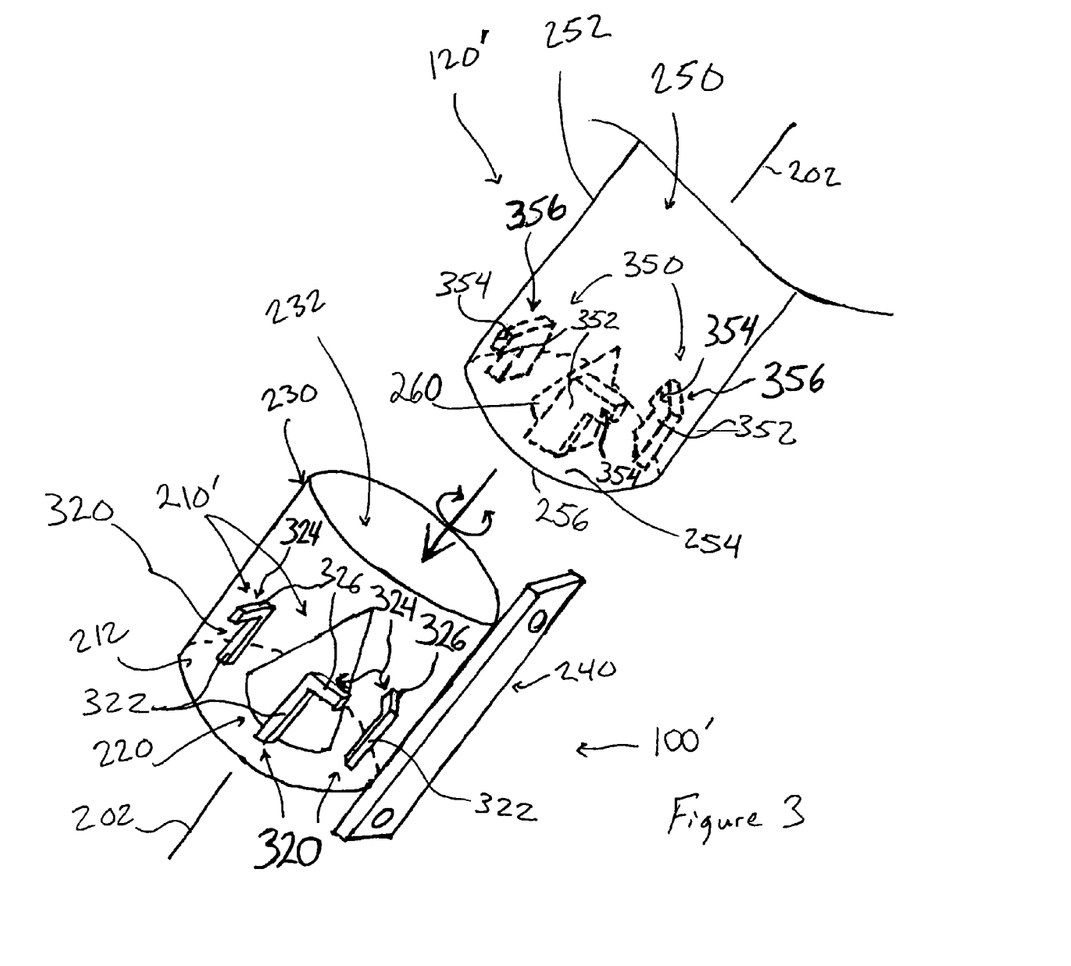
FIG. 3 is a perspective view of another embodiment of the container holder and corresponding container of FIG. 1.
Figure 4:
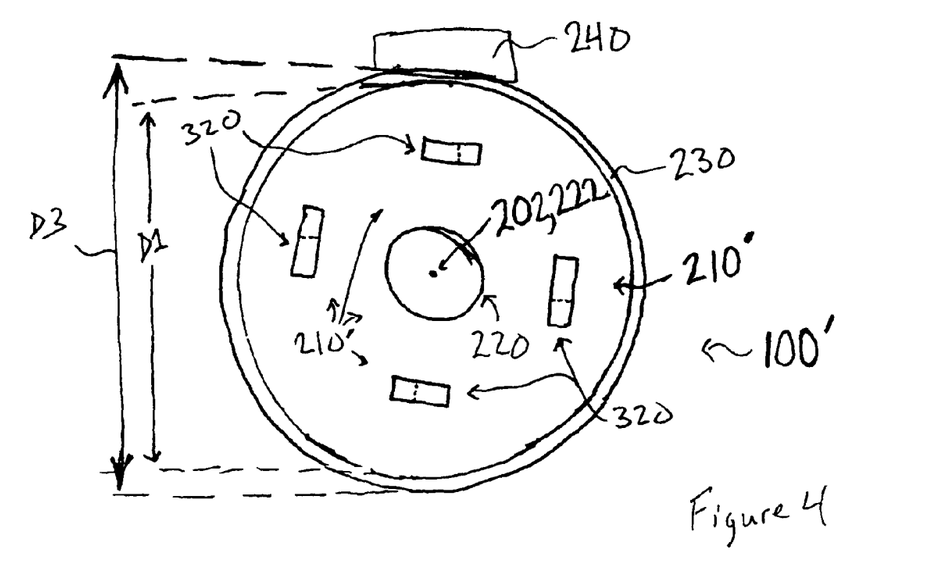
FIG. 4 is a top view of the container holder of FIG. 3.
Figure 5:
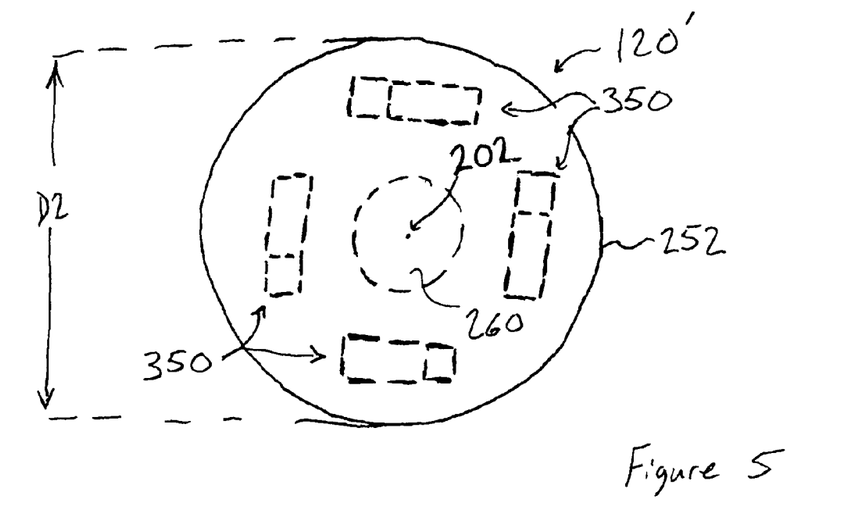
FIG. 5 is a bottom view of the container of FIG. 3.
Figure 6:
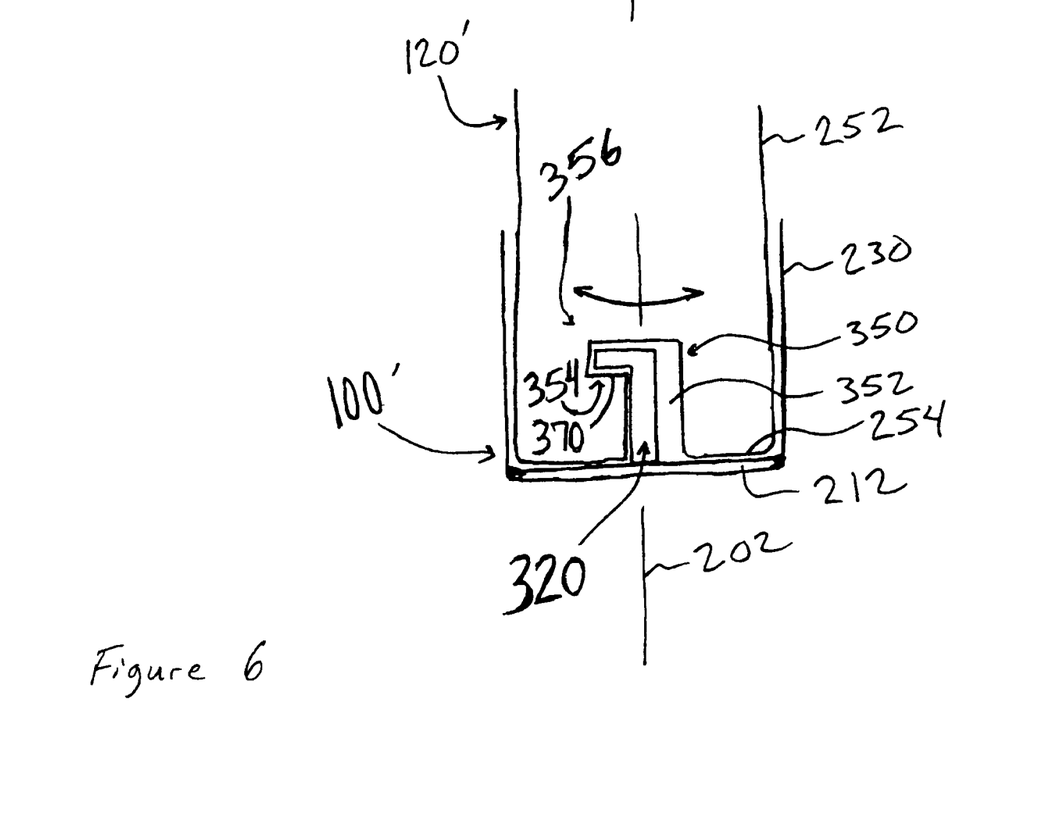
FIG. 6 is a cross sectional side view of the container and container holder of FIG. 3 illustrating an interlocking mechanism of some embodiments of the present invention.

FIGS. 3-6 show another embodiment of the container holder and the container. FIG. 3 is a perspective view of a container holder 100' and corresponding container 120'. FIG. 4 is a top view of the holder 100' and FIG. 5 is a bottom view of the container 120'. FIG. 6 is a cross-sectional side view of the holder 100' and the container 120' to illustrate an interaction between the holder 100' and the container 120'. The holder 100' includes the base portion 212, shield 230, a mount 240, and projections 210I. The container 120' includes the cavity 250 formed from the longitudinal body 252, bottom 254' with recesses 260 and 350, and a top (FIG. 1). The projections 210' and recesses 260 and 350 form interdependent reciprocal mating members that can inter-engage for interlocking the container 120' with the holder 100'.

The projections 210' include prongs 320 and the guide member 220. Recesses 350 have a negative space 352 corresponding to the prongs 350. The prongs 320 have elongate sections 322 that extend away from the base portion 212 in a generally orthogonally manner. The elongate sections 322 of the prongs 320 can have a rod-like configuration, a prism-like configuration, or other suitable configuration. A distal end 324 of the elongate section 322 includes a retaining member 326, such as a lip that extends away from the elongate section 322. In some embodiments, the retaining member 326 extends orthogonally away from the elongate section 322 to create a hook-like configuration for interlocking the container 120' with the holder 100'. The retaining member 326 can have a linear configuration, an arc-like configuration, and the like.

The prongs 320 are distributed about the base portion 212. For example, the prongs 320 can be distributed radially about a center axis 202 of the base portion 212. The prongs 320 are positioned to fit within an outline 256 of the bottom 254 of the container 120' so that when the container 120' is inserted into the holder 100', the prongs 320 extend into the bottom 254 of the container 120' through corresponding recesses 350 that are formed in the bottom of the container 120', and which extend into the cavity 250 of the container 120'. In some embodiments, the elongate sections 322 of the prongs 320 extend a distance of about one-eighth of an inch to about three inches, or about one-fourth of an inch to about three-fourths of an inch from the base portion 212, or can extend about one-third of the length of the longitudinal body of the container 120'.

The container 120' can be a water bottle composed of plastic for retaining a liquid and preferably has a cylindrical configuration, which can be ergonomically formed for a user to grip with one and/or both hands. The bottom 254 of the container 120' includes recesses 350 formed therein to provide a negative space 352 corresponding to the prongs 320 of the holder 100'. In some embodiments, the recesses 350 are molded, extruded, or otherwise formed in the bottom 254 so that the recesses 350 extend into the cavity 250. In some embodiments, the recesses 350 can extend into the cavity 250 about one-eighth of an inch to about three inches, or about one-fourth of an inch to about three-fourths of an inch from the base portion 212, or can extend about one-third of the length of the longitudinal body of the container 120'.

The recesses 350 have sections 352 corresponding to the elongate sections 322 of the prongs 350. The sections 352 of the recesses 350 are sized to accommodate the elongate sections 322 and the retaining member 326 since the retaining member 326 juts out from the elongate sections 322. The recesses 350 corresponding to prongs 320 also include a notch 354 at the distal end 356 of the recesses 350 for receiving the retaining member 326 of the prongs 320.

As the container 120' is being inserted into the holder 100', the bottom 254 of the container 120' is guided into the holder 100' by the guide member 220 and/or the shield 230. The container 120' can be guided by the guide member 220 and/or the shield 230 so that the recess 260 engages and receives the guide member 220. As the guide member 220 extends into the recess 260, the bottom of the container 120' is positioned so that the recesses 350 can be aligned with the prongs 320.

Once the recesses 350 are aligned with the prongs 320, the container 120' can be further inserted into the holder 100' causing the prongs 320 to extend into and engage the recesses 350. The container 120' is fully inserted into the holder 100' when the bottom 254 of the container 120' rest on the surface of the base portion 212 and/or when the prongs 320 have been fully received by the recesses 350. After the container 120' is fully inserted into the holder 100', the user rotates the container 120' (e.g., clockwise) about the center axis 202 so that the retaining member 326 of the prongs 320 extend into the notches 354 of the recesses 350 to interlock the container 120' with the holder 100'. In this locked position, the holder 100' securely retains the container 120' so that movement and removal of the container 120' is prevented or reduced. If a user attempts to remove the container 120' from the holder 100' when the container 120' is interlocked with the holder 100', the retaining member 326 presses against a lower portion 370 of the notch, which prevents the prongs 320 from sliding out of the recesses 350 (FIG. 6). To remove the container 120' from the holder 100', the container 120' is rotated in the opposite direction (e.g., counterclockwise) so that the retaining members 326 of the prongs 320 no longer engage the notches 354 of the recesses 350 and the user pulls the container 120' from the holder 100' so that the projections 210' slide out from the recesses.

Figure 7:
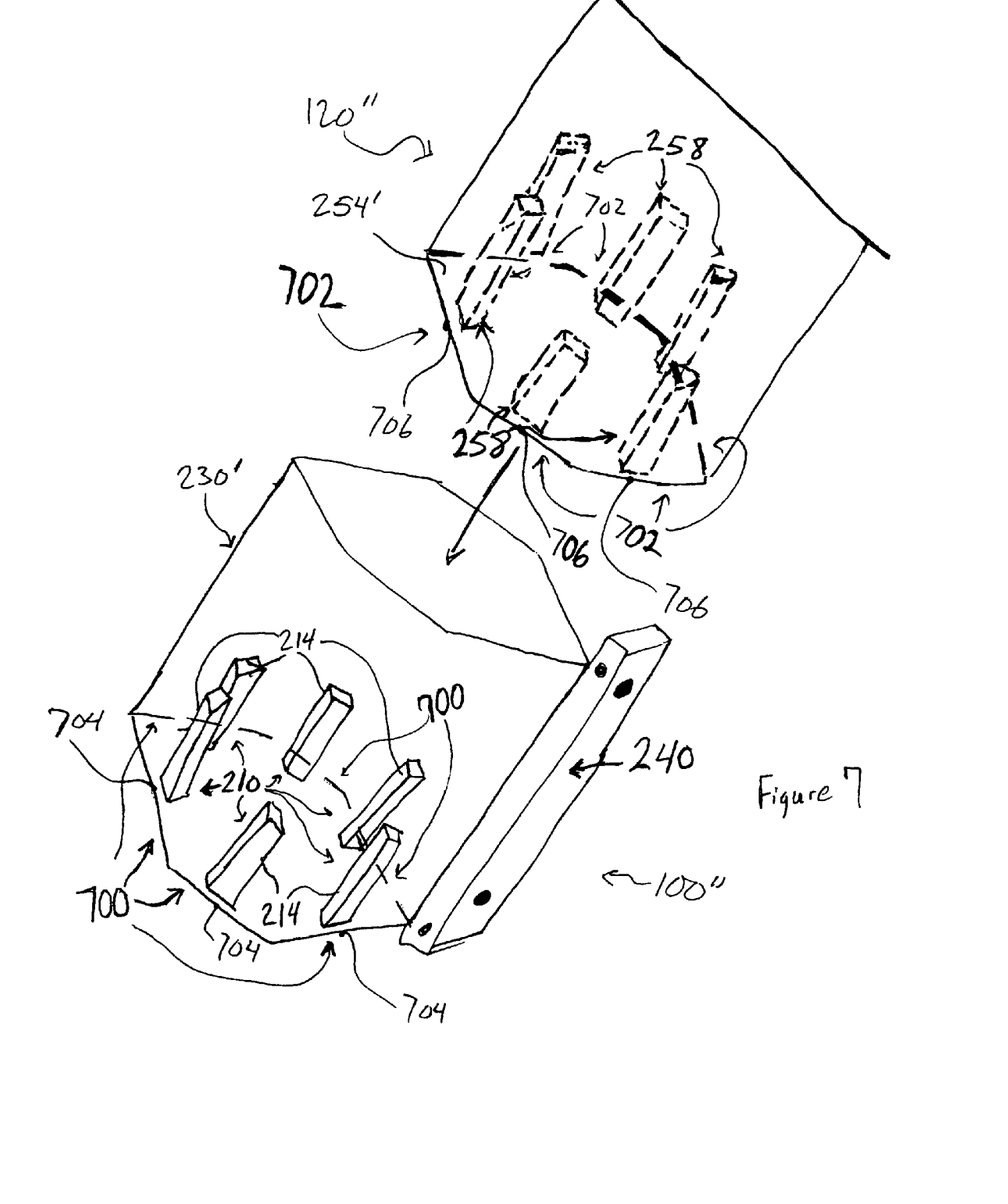
FIG. 7 illustrates an exemplary embodiment in which projections of a container holder are aligned with recesses of a container automatically when the container is inserted into the container holder.

FIG. 7 is an exemplary embodiment of a holder 100" and container 120", where a bottom portion of the container 120" is configured as a polygon, which in the present embodiment is a hexagon. The holder 100" includes a base portion 212', shield 230', the mount 240, and projections 210. The container includes the cavity 250 formed from the longitudinal body 252, bottom 254" with recesses 258, and a top (FIG. 1). Although the present embodiment includes the projections 210, those skilled in the art will recognize that other projections, such as projection 310 can be implemented.

The base portion 212' can be configured to have a polygon configuration that is similar to that of the bottom 254' of the container. Likewise the shield 230' can be formed to correspond to the shape of the bottom 254' of the container 120" so that the shield can receive the container 120". For example, a cross-section of the shield against the shields longitudinal axis can have a hexagonal configuration.

Prongs 214 are distributed about the base portion such that each line segment 700 of the hexagon is associated with a prong, where the prongs are preferably position inward of a center point 704 of the length of the line segments 700. Recesses 258 formed in the bottom of the container 120" are distributed in a similar manner, preferably inward of a center point 706 of the line segments 702, so that one of the recesses 258 is associated with each line segment 702 forming an outline 256 of the bottom 254' of the container 120". By disposing the prongs 214 with respect to each line segment 700 and the recesses with respect to the line segments 702 in a substantially symmetrical manner, the prongs 214 and recesses 258 are automatically aligned when the user inserts the container 120" into the holder 100". Once the container 120" is aligned to fit within the shield 230', no further alignment is required and the recesses 258 can receive the prongs 214.

The prongs (e.g., prongs 214 and 320) can be coated with and/or formed from a polymer, such as rubber. Likewise, the recesses (e.g., recesses 258, 260, and 350) can also be coated with a polymer so that the friction between the prongs and the recesses is increased to further secure the container to the holder.

Figure 8:
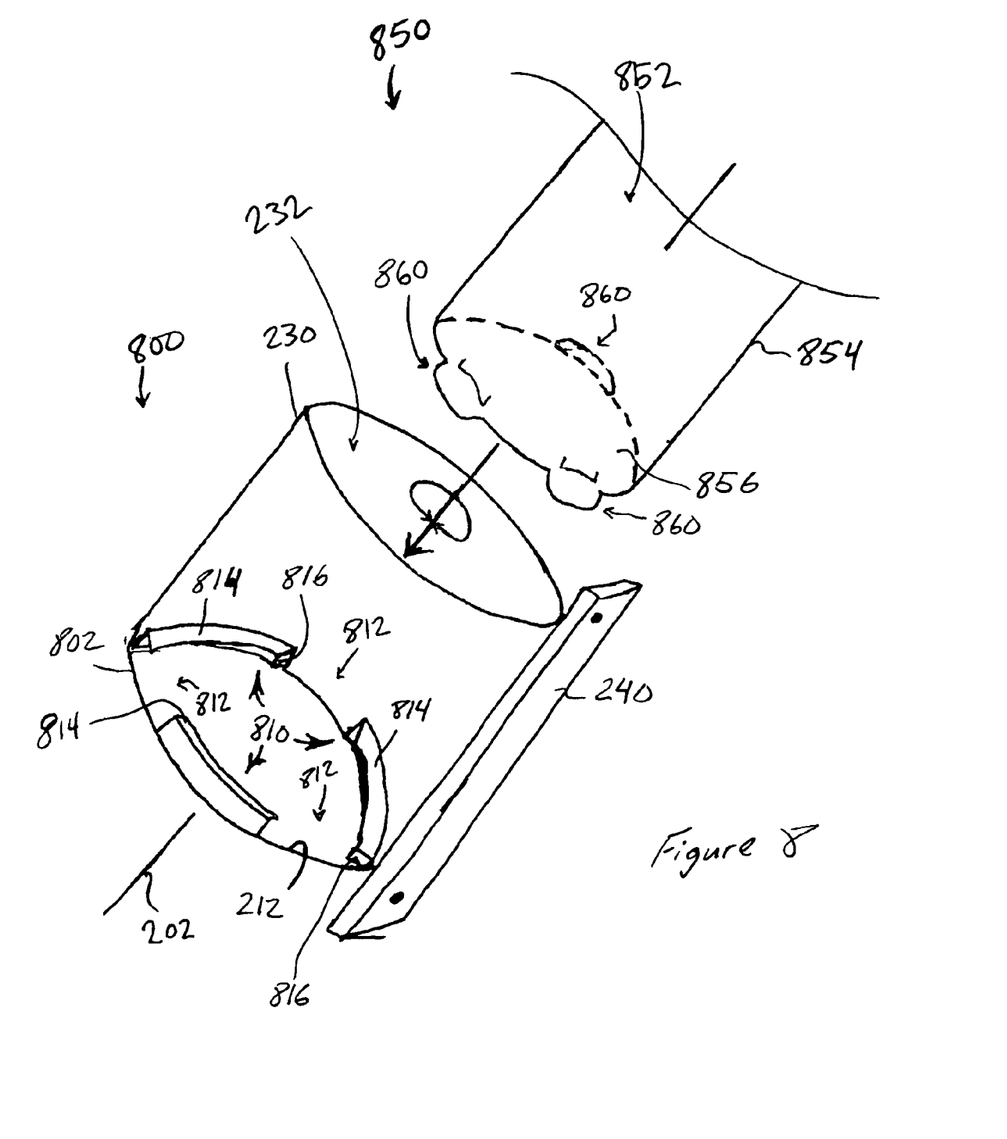
FIGS. 8-10 show another container and container holder implemented in accordance with embodiments of the present invention.
Figure 9:
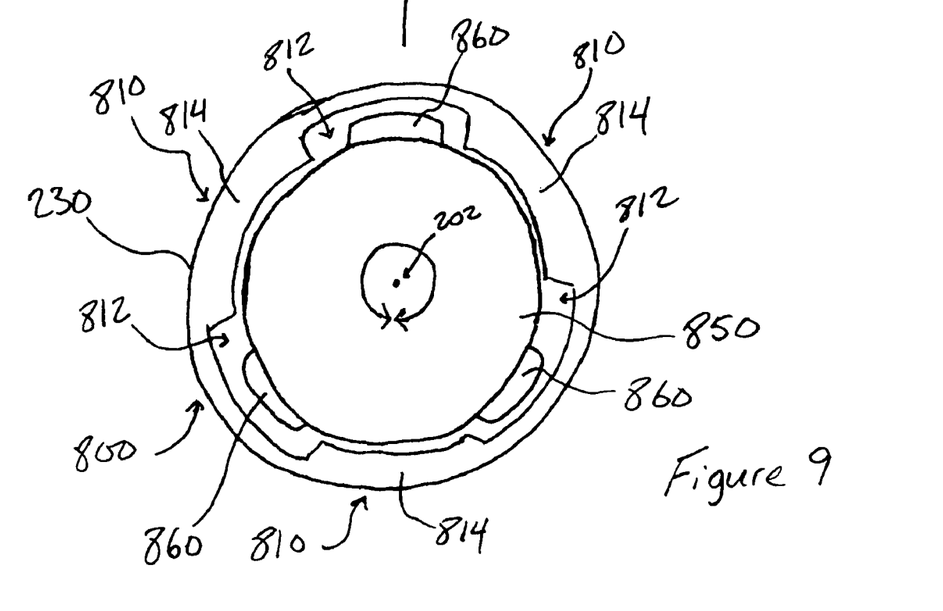
Figure 10:
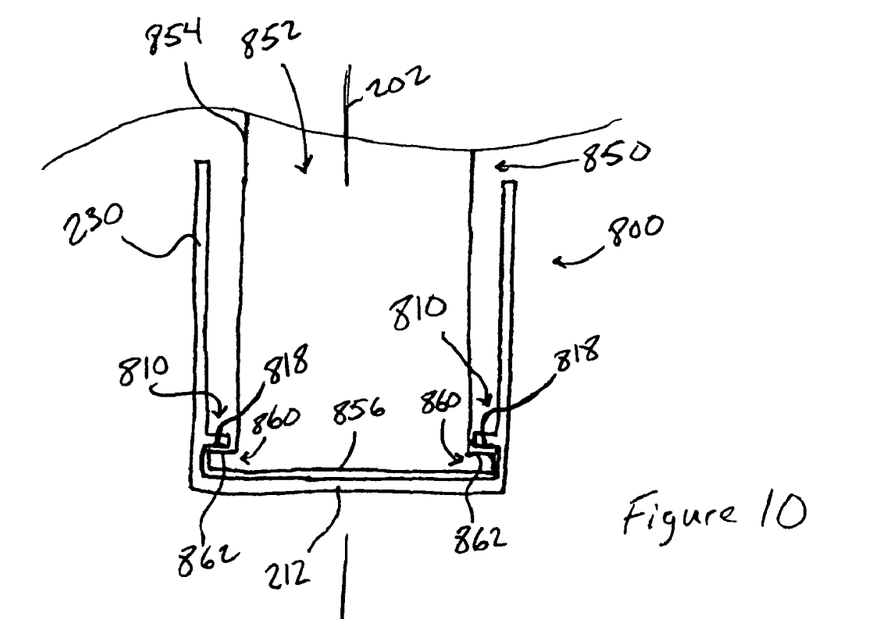

FIGS. 8-10 illustrate holder 800 for retaining a container 850. FIG. 8 shows a perspective view of the holder 800 and the container 850. FIG. 9 shows a top view of the container 850 in the holder 800 in an unlocked position. FIG. 10 shows a cross-sectional, side view of the container 800 and the holder 800 to illustrate an interaction between the container 850 and the holder 800 in a locked position. The holder 800 includes the base portion 212, shield 230, mount 240, and projections 810. The container 850 includes a cavity 852 formed from a longitudinal body 854, a bottom 856, projections 860, and a top (FIG. 1). The projections 810 and 860 form interdependent reciprocal mating members that can inter-engage to interlock the container 850 with the holder 800

The projections 810 of the holder 800 are positioned about a perimeter 802 of the base portion 212 and are spaced apart to form channels 812. The projections 810 can extend from the base portion or can extend from the shield 230. The projections 810 have a lip 814 along the radial length of the projections 810 forming overhang sections extending into the interior area 232 formed by the shield 230. The lip 814 of the projections 810 extend radially inward towards the center axis 202 of the holder 800. The lip 814 extends parallel to, and is spaced apart from, the base portion 212. One end of the projections 810 includes a stop wall 816 having a surface that extends between the base portion 212 and an end of the lip 814.

The bottom 854 of the container 850 can include projections 860 that interlockingly engage the projections 810 when the container 850 is retained by the holder 800 in the locked position. The projections 860 extend radially from the bottom 854 such that the projections 860 extend beyond the diameter D2 of the container 850. The projections 810 and 860 form interdependent mating members for selectively locking the container 850 in the holder 800 to prevent the container 850 from being removed from the holder 800.

As the container 850 is inserted into the holder 800, the bottom 854 of the container 800 is guided into the holder 800 by the shield 230. The container 850 can be guided by the shield 230 so that the shield 230 receives the bottom 854 of the container 850. As the container 850 extends into the interior area 232 formed by the shield 230, the bottom of the container 120' can be positioned so that the projections 860 can be aligned with the channels 812.

Once the projections 860 are aligned with the channels 812, the container 850 can be further inserted into the holder 800. The container 850 is fully inserted into the holder 100' when the bottom 254 of the container 850 rest on the surface of the base portion 212. After the container 850 is fully inserted into the holder 800, the user rotates the container 850 (e.g., clockwise) about the center axis 202 into a locked position so that the projections 860 and the projections 810 have vertically overlapping configuration such that an upper surface 862 of the projections 860 and a lower surface 818 of the lips 814 are facing each other and can be in contact with one another. The container 850 can be rotated until the projections 860 contact the stop wall 816 of the projections 810. The holder 800 securely retains the container 850 when in the locked position so that removal of the container 850 from the holder 800 is prevented. If a user attempts to remove the container 850 from the holder 800 when the container 850 is interlocked with the holder 800, the projections 860 press against the lip 814 of the projections 810, which prevents the projections 810 from sliding out of the holder 800. To remove the container 850 from the holder 800, the container 850 is rotated in the opposite direction (e.g., counterclockwise) so that the projections 860 are no longer vertically overlapped with the projections 810 and the user pulls the container 850 from the holder 800 so that the projections 860 slide out from the holder 800 via channels 812.

Figure 11:
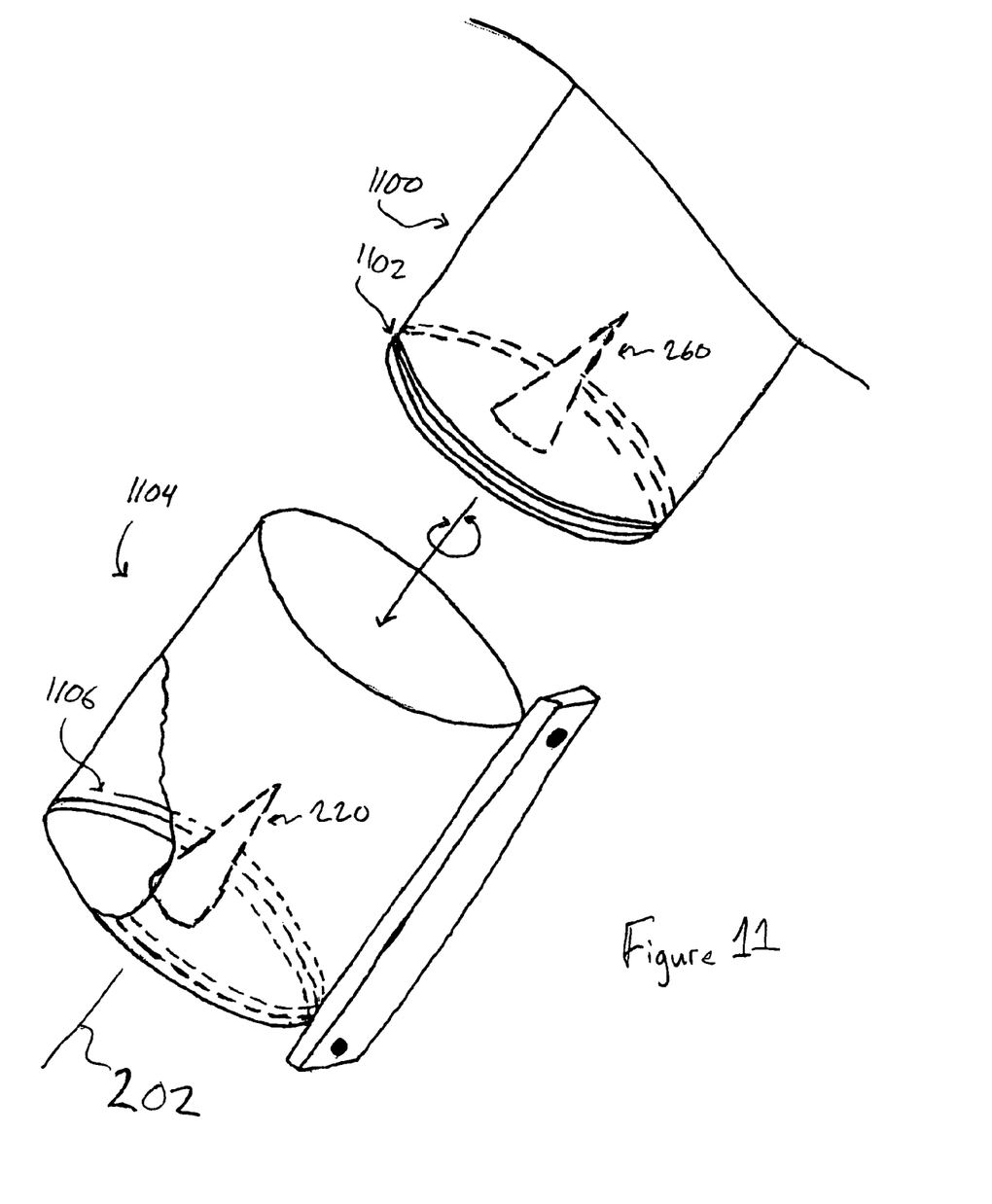
FIG. 11 illustrates an exemplary embodiment of the present invention which includes inter-engaging threaded portions to interlock a container with a container holder that is mountable to a bicycle.

In another embodiment, as shown in FIG. 11, a container 1100 is formed having a threaded bottom portion 1102 and a container holder 1104 is formed having a shield 230" with a corresponding reciprocal threaded portion 1106. The threaded portions 1102 and 1106 form interdependent mating members that inter-engage to interlock the container 110 with the holder 1104. The container 1100 can be inserted into the interior area 232 formed by the shield 230" and can be rotated about the center axis 202 so that the threaded portion 1102 of the container 1102 threadingly engages the threaded portion 1106 of the holder 1104. The container can include the recess 260 and the holder can include the guide member 220 to aid in guiding the threaded portion 1102 of the container into the corresponding reciprocal threaded portion 1106 of the holder 1104.

While preferred embodiments of the present invention have been described herein, it is expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A bottle holder system for a bicycle comprising:
a bottle having a first mating member integrally formed in a bottom portion of the bottle; and
a bottle holder including a mounting member for mounting the bottle holder to a portion of the bicycle, a shield forming an interior area for receiving the bottle through a first end, and a second mating member disposed towards a second end of the shield, away from the first end of the shield, and within the interior area formed by the shield, the first and second mating members having sections extending transversely to a longitudinal axis of the bottle to form opposing surfaces when the bottle is inserted into the interior area formed by the shield, the bottle being selectively retained by the bottle holder upon rotation of the bottle, wherein when the bottle is retained by the bottle holder the sections of the first and second mating members are aligned to vertically overlap to block movement of the bottle along the longitudinal axis of the bottle, a base portion of the bottle holder disposed at the second end of the shield, wherein the second mating member is a projection having an elongate section extending from the base member into the interior area and a retaining member extending from a distal end of the elongate section generally perpendicular to the elongate section and extending generally radially with respect to the longitudinal axis when the bottle is inserted into the interior area, the second mating member being disposed away from the shield, wherein the first mating member is a recess forming a negative space in the bottom portion of the bottle that extends towards a cavity of the bottle, the recess including a section corresponding to the elongate section of the second mating member and a notch at a distal end of the section corresponding to the retaining member of the second mating member, the recess being sized to accommodate the retaining member and elongate section of the second mating member.

2. The bottle holder system of claim 1, wherein the second mating member forms a prong.

3. The bottle holder system of claim 2, wherein the shield at least partially surrounds, and is spaced away from, the prong, the shield being configured to receive at least a portion of the bottle.

4. The bottle holder system of claim 2 further comprising a guide structure configured to align the bottle with the bottle holder to facilitate penetration of the prong into the recess.

5. The bottle holder system of claim 4, wherein the guide structure is a guide member that extends a greater distance from the base portion than that of the prong.

6. A bottle holder system for a bicycle comprising:
a bottle having a first mating member integrally formed in a bottom portion of the bottle;
a holder to receive the bottle, the holder having a shield and a second mating member, the shield forming an interior area for receiving the bottle through a first end, the first and second mating members being interdependent so that the first and second mating members inter-engage upon receipt of the bottle by the holder, the first and second mating members facilitating retention of the bottle by the holder, the bottle being rotatable about a longitudinal axis of the bottle between a locked position, in which movement along a direction of the longitudinal axis of the bottle is blocked, and an unlocked position, in which the bottle is moveable along the longitudinal axis of the bottle; and
a base member disposed at a second end of the shield, wherein the second mating member includes a projection having an elongate section extending from the base member into the interior area and a retaining member extending from a distal end of the elongate section generally perpendicular to the elongate section and generally radially about the longitudinal axis when the bottle is inserted into the interior area, the second mating member being disposed away from the shield, the first mating member being a recess forming a negative space in the bottom portion of the bottle that extends towards a cavity of the bottle, the recess including a section corresponding to the elongate section of the second mating member and a notch at a distal end of the section corresponding to the retaining member of the second mating member, the recess being sized to accommodate the retaining member and elongate section of the second mating member.

7. The system of claim 6, wherein, the second mating member is disposed away from a circumferential surface of the shield.

8. The system of claim 6, wherein the holder comprises a guide member, the guide member having a substantially conical configuration extending away from the base portion to facilitate alignment of the bottle with the holder and penetration of the guide member into the recess.

9. The system of claim 8, wherein the guide member extends a greater distance from the base portion than that of the second mating member.

10. The system of claim 6, wherein the holder is integrally formed with the bicycle.

11. The system of claim 6, wherein the holder is mounted on the bicycle.

* * * * *